United States Patent
Kramer

(10) Patent No.: US 6,230,934 B1
(45) Date of Patent: May 15, 2001

(54) METHOD FOR MEASURING AND DELIVERING HYPER-CONCENTRATED LIQUIDS

(75) Inventor: Daniel Raymond Kramer, Huntington Woods, MI (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/378,090

(22) Filed: Aug. 20, 1999

Related U.S. Application Data

(60) Provisional application No. 60/097,909, filed on Aug. 26, 1998.

(51) Int. Cl.[7] .................................................. B67B 7/00
(52) U.S. Cl. .................................................. 222/1; 222/639
(58) Field of Search .................................. 222/639, 642, 222/643, 1; 73/1.36, 1.31, 1.32

(56) References Cited

U.S. PATENT DOCUMENTS

| | | | |
|---|---|---|---|
| 4,331,262 | * 5/1982 | Snyder et al. | 222/37 |
| 4,597,507 | * 7/1986 | Rosenblum et al. | 222/16 |
| 4,676,403 | * 6/1987 | Goudy, Jr. et al. | 222/54 |
| 5,014,211 | * 5/1991 | Turner et al. | 364/478 |
| 5,200,065 | * 4/1993 | Sinclair et al. | 210/104 |
| 6,055,831 | * 5/2000 | Barbe | 68/12.18 |

FOREIGN PATENT DOCUMENTS

404013928 * 1/1992 (JP) ..................................... 222/639

* cited by examiner

*Primary Examiner*—Kevin Shaver
*Assistant Examiner*—Melvin A Cartagena

(57) ABSTRACT

The present invention is a system used in measuring very small quantities (i.e., a few milliliters) of liquids, preferable hyper-concentrated liquids, e.g., car wash products being delivered through a pumping station into various types of car wash equipment. The benefit is that it provides a means for measuring precisely how much product is being used at any given point in time and is fast and clean. The system includes a method and apparatus for accurately calibrating a liquid flow rate in the range of one milliliter per minute to twenty milliliters per second, preferably in the range of four to ten milliliters per minute.

8 Claims, 4 Drawing Sheets

METHOD FOR MEASURING AND DELIVERING HYPER-CONCENTRATED LIQUIDS

This application claims the benefit of U.S. Provisional Application No. 60/097,909, filed Aug. 26 1998, the entire disclosure of which is hereby incorporated by reference.

BACKGROUND OF THE INVENTION

The introduction of extremely concentrated detergents (hyper concentrates) into the vehicle washing, part washing and commercial laundry industries has resulted in the need to meter these high cost-per-ounce chemicals with great precision.

The practice in the past has been to draw products directly from shipping containers. This practice prevented the user from determining the level of product remaining and resulted in unused (therefore wasted) product being left in the shipping container after the substitution of a new container.

Injection pumps with precise injection capabilities are in use but no accurate measuring system is available for measuring low volume dosing. Attempts to use laboratory-style measuring cylinders produced grossly inaccurate results.

Previous approaches involved cumbersome use of laboratory measuring cylinders, requiring the removal and replacement of chemical feed lines and the loss of prime in feed lines. Loss of prime in the feed line prevents the injection pump from delivering product and is time-intensive to remediate.

Previous systems also forced the technician to come into physical contact with the material. The previous systems required the pouring of product into the measuring device in order to charge the system prior to measurement.

SUMMARY OF THE INVENTION

The present invention is a system used in measuring very small quantities (i.e., a few milliliters) of hyper-concentrated liquids, e.g., car wash products being delivered through a pumping station into various types of car wash equipment. The benefit is that it provides a means for measuring precisely how much product is being used at any given point in time and is fast and clean.

DESCRIPTION OF THE PREFERRED EMBODIMENTS

Figure 1:
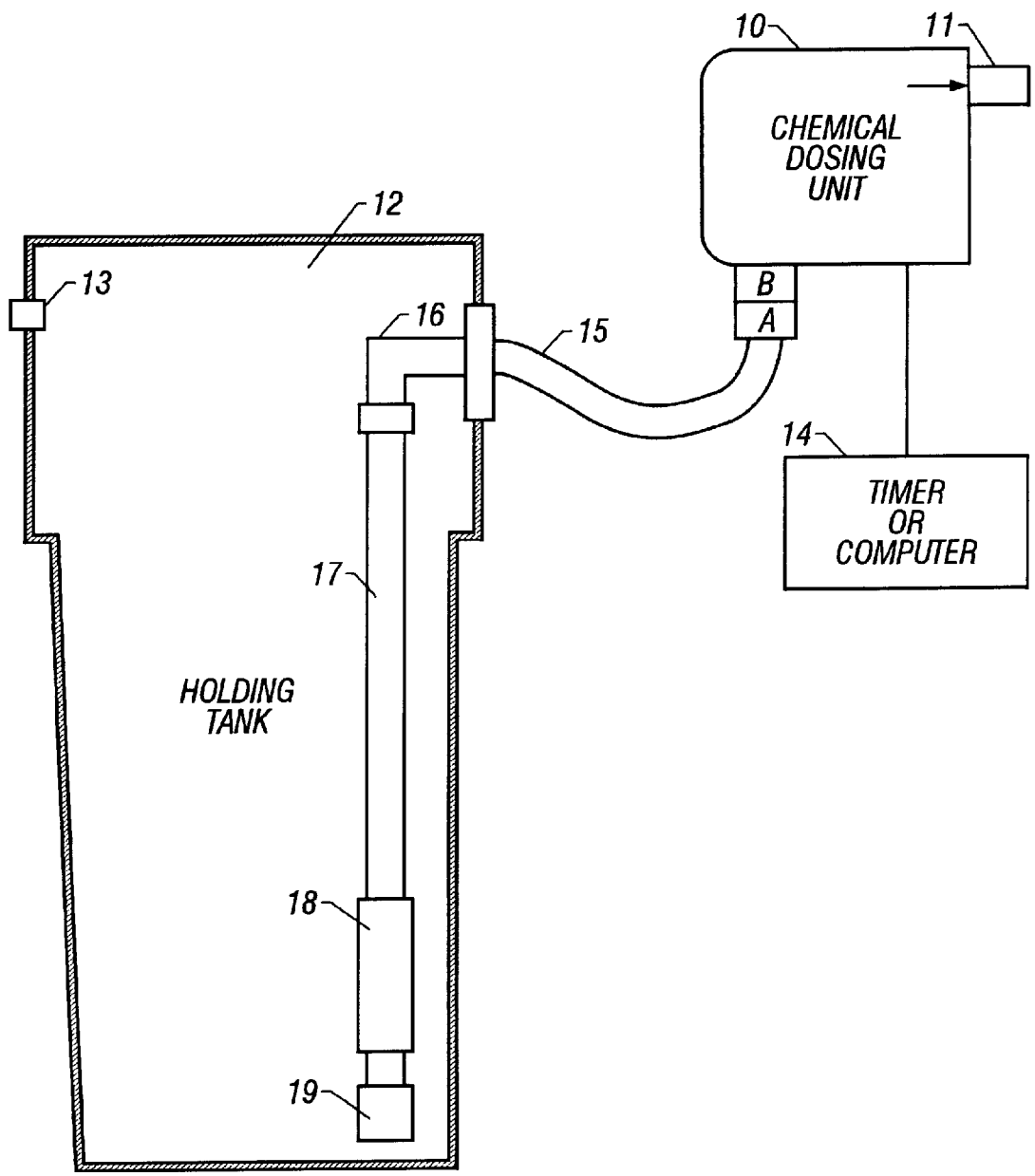
FIG. 1 is a schematic representation of the system in normal operation.

The use of hyper-concentrates is fairly new to the car wash industry as are the pumps used to feed the chemicals to the equipment. The system and procedure disclosed herein requires only six milliliters of a hyper-concentrated product to produce the same results as an ounce or so (approximately 30 ml) of a non-concentrated chemical. The challenge in prior systems has been to know precisely how much product is being used at any given time since cost of the hyper-concentrates is substantially more per milliliter. Prior to the invention of this system, it might have taken a technician an hour or more to measure all of the products (i.e., detergents, cleaners and waxes) and clean up his materials. With the system disclosed herein, including the attachments that are placed on the chemical feed systems and the product containers, a technician can perform the same work in less than fifteen minutes with greatly improved accuracy.

The object of the invention is to provide improved accuracy in the measurement of small amounts of detergents, cleaners and waxes in the vehicle washing industry. The invention may also be useful in other applications such as the parts-washing and commercial laundry industries.

The invention precisely measures the amount of a liquid chemical, dye or other additive delivered into a system. Additionally, it can be used with active pumping or passive injection and at levels exceeding thirty-six gallons per day.

Referring now to FIGS. 1–4, the system comprises a dosing pump 10, a translucent refillable holding tank 12, a series of leakproof, quick disconnect (QD) fittings A, B, C, D, E, F and G, a precisely calibrated measuring cylinder 20 and accessories. The QD fittings are automatically closed (sealed) when not mated.

The advantage of the translucent refillable holding tank 12 is that it is equipped with a "gallons remaining" scale that provides an instant indication of inventory levels. The translucent refillable holding tank 12 is filled from standard shipping containers (usually five to seven gallons) and also eliminates the need for bulky drums and difficult-to-handle bag-in-the-box packaging systems.

During normal operation (see FIG. 1), the chemical feed line 15 is securely connected, eliminating loss of pump 10 prime, a major cause of poor results. Applicant's invention allows measurements to be accurately made without removing feed line 15, losing liquid pump 10 prime or requiring physical handling of the material to be measured. The accuracy of the system is ±1 milliliter ($\frac{1}{30}^{th}$ ounce) per minute.

The system also provides a very significant saving in manpower. Previous systems required over one hour for a trained technician to measure the delivery rate of four products. The instant invention has reduced the time required to approximately ten to twelve minutes for the same individual.

An additional advantage results from the fact that the person measuring the product does not come into contact with the product being measured. This results in virtual elimination of spillage or splashing accidents.

The uses of the system are in, but not limited to, the following industries: commercial laundry, vehicle washing, textile, printing, parts washing, photo developing and paint manufacturing.

SYSTEM OPERATION

Normal Operation (NORMAL)

In NORMAL operation (see FIG. 1), the dosing pump 10 (which has previously been precisely calibrated to an accuracy of ±1 ml/min by the subsequently-described procedure) receives fluid through its intake QD fitting B and delivers fluid through its output fitting 11 to the plumbing system of a receiving system (not shown) such as, e.g., a commercial car wash. During this period of time, dosing pump 10 intake QD fitting B is attached to holding tank 12 via chemical feed line flexible tubing 15 which terminates in QD fitting A, allowing unimpeded flow of product from the holding tank 12 to the chemical dosing pump 10. Quick-disconnect fitting A is attached to one end of flexible tubing 15, the other end being attached to the bulkhead of holding tank 12 via a standard ¼"×¼" hose barb. Fluid communication with the product in holding tank 12 is completed through a 90° fitting 16, flexible supply tubing 17, a weight 18 and anti-backflow foot valve 19. This arrangement ensures that the supply tubing 17 hangs straight down without crimping. It also ensures that fluids are withdrawn from the bottom of holding tank 12 during normal operation and that no fluids are drawn back into the holding tank 12 by backflow during other operations. A vent 13 allows air to enter the holding tank 12 as it is emptied during normal operation. The dosing pump 10 may be controlled by a timer or a car wash computer system 14 known to those skilled in the art.

Prior to connecting the system for NORMAL operation per FIG. 1, the system is calibrated by filling a measuring cylinder 20 (according to the subsequently described FILLING procedure) with the liquid product to be delivered (see FIG. 2). The measuring cylinder 20 has accurately-graduated markings 21 of "milliliters removed". After filling the measuring cylinder 20 with the desired product, the filled measuring cylinder 20 is then connected to the dosing pump 10 for CALIBRATION per FIG. 3. The dosing pump 10 is turned on and fluid is pumped from the cylinder 20 for a desired period of time, e.g., one minute. The amount of fluid removed from the cylinder 20 during the selected period of time can then be determined by calculating the difference between the "ending" volume and the "beginning" volume. If the cylinder 20 is initially filled to the "zero" level, it is simply a matter of reading the level shown on the graduated markings 21 of the cylinder 20. This reading, or calculation as the case may be, is the volume removed by the pump 10, i.e., the volume delivered by the pump 10, per unit of time e.g., ml/min.

Filling Measuring Cylinder 20 (FILLING Procedure)

Figure 2:
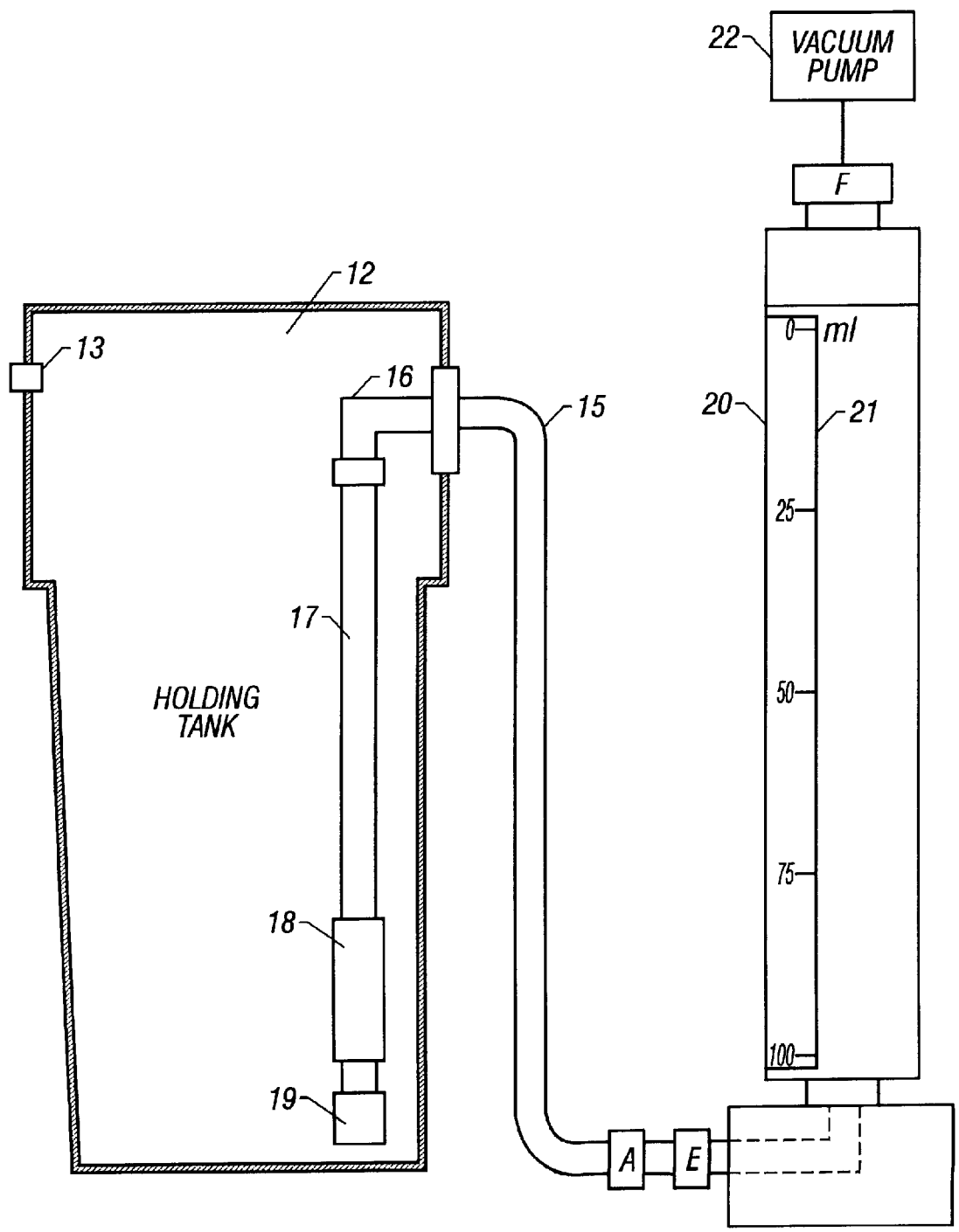
FIG. 2 is a schematic representation of the system set-up for filling a calibrated cylinder.

Referring now to FIG. 2 for the FILLING procedure, the measuring cylinder 20 is filled by performing the following operations:

From the FIG. 1 (NORMAL operation) configuration, holding tank 12 chemical feed line flexible tubing 15 and QD fitting A are disconnected from QD fitting B. Fitting A is then attached to measuring cylinder 20 QD fitting E. The product to be measured is drawn from holding tank 12 into the measuring cylinder 20 by connecting a vacuum source 22 to measuring cylinder 20 QD fitting F. It should be noted that, because of the leakproof QD fitting A, chemical feed line flexible tubing 15 remains filled with tie fluid product for subsequent use. This enables the CALIBRATION and NORMAL operating procedures to be performed without loss of prime to pump 10.

Measuring Product Flow Rate (CALIBRATION Procedure)

Product flow rate is measured and the equipment is calibrated using the set-up of FIG. 3 as follows:

From the FIG. 2 (FILLING) set-up and with an accurately filled and marked measuring cylinder 20, the vacuum source 22 is disconnected from measuring cylinder 20 QD fitting F, and holding tank 12 QD fitting A is disconnected from measuring cylinder 20 QD fitting E. Then, QD fitting B on chemical dosing pump 10 is attached to measuring cylinder 20 QD fitting E via an interconnecting fluid line terminating in QD fittings C–D. The latter fluid line C–D must be filled with product fluid for accuracy. This may be done by attaching a hose to QD fitting D (prior to attaching it to QD fitting E), immersing the open end of the hose into a container of product fluid, then starting the pump 10. When fluid line C–D is filled, the hose is disconnected leaving it filled with fluid and ready for attachment to QD fitting E. Alternatively, fluid line C–D may be filled with product fluid by inserting it between QD fittings A and E (using a suitable adapter) during the FILLING operation of FIG. 2.

The dosing pump 10 is then started and the actual measurement is accomplished by recording the draw down of product from the cylinder 20 over a measured period of time. This measurement may be made by the instant invention to an accuracy of ±1 ml/min. Using this procedure, Applicant has been able to accurately and repeatedly measure dosages as low as 4 ml (0.135 oz) in a 45 second time span. This equates to 5.33 ml (0.18 oz) in a 60 second period. Dosages as high as 100 ml (3.38 oz) in a 5 second time span have been accurately measured. Ultra-low dosages, as low as 1 ml (0.038 oz) per minute, are possible and may be applicable in other industries. The pump 10 may be controlled by adjusting its Stroke Length Control, which permits the stroke length to be adjusted to the required volume, and/or Stroke Rate Adjustment. The Stroke Rate Adjustment allows the desired flow to be controlled by allowing the strokes per minute to be adjusted between 10% and 100% of maximum.

Return to Normal Operation (NORMAL)

Figure 3:
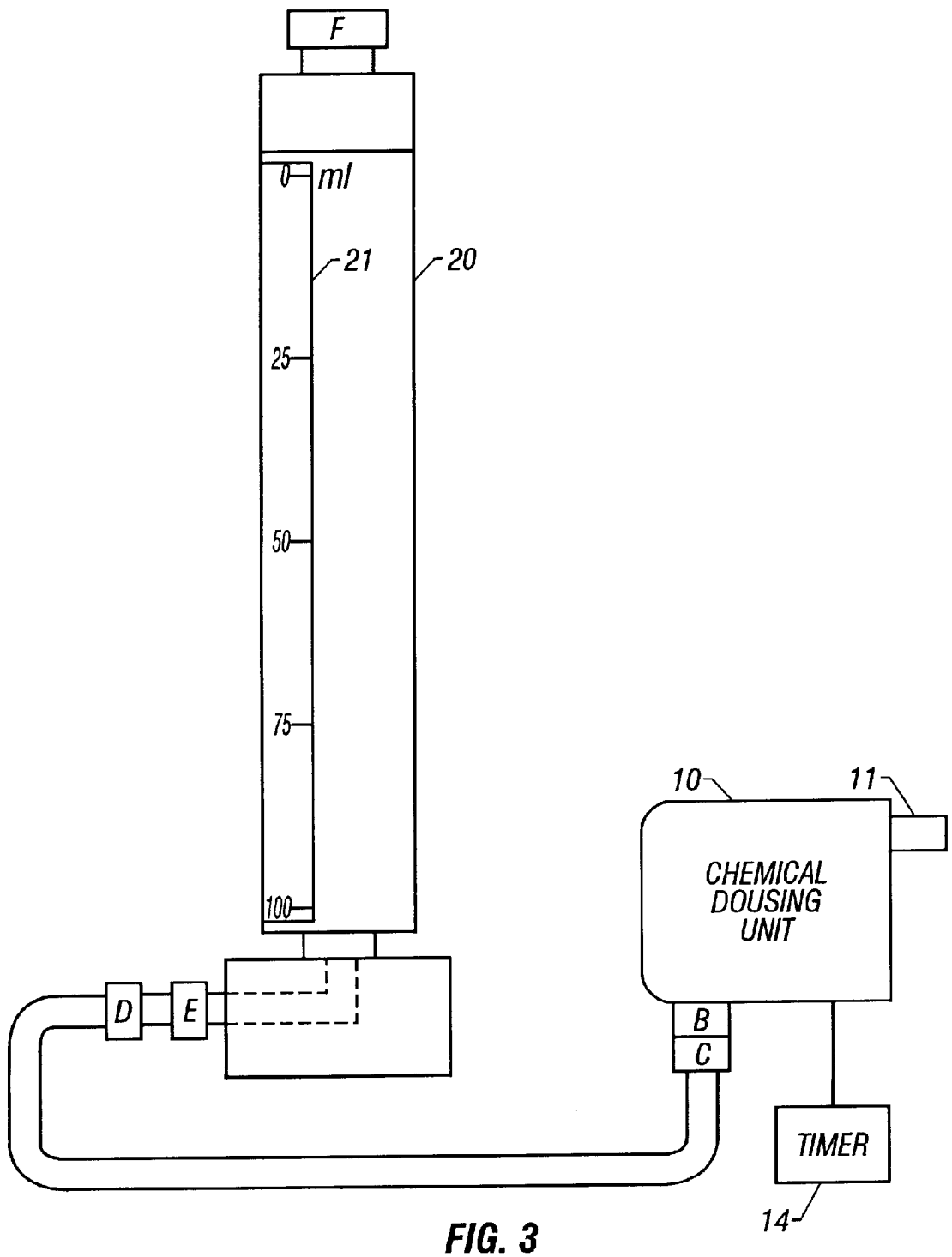
FIG. 3 is a schematic representation of the system set-up for calibrating a dosing pump.

To revert to NORMAL operation from the FIG. 3 CALIBRATION set-up, dosing pump 10 input QD fitting B is disconnected from measuring cylinder 20 QD fitting E (by removing tubing C-D) and is reconnected to holding tank 12 via chemical feed line 15 terminating in QD fitting A (as in FIG. 1). Since the flexible tubing 15 is filled with product fluid, there is no loss of prime to the pump 10 as noted above.

Power Flush/Cleanout (FLUSH)

Figure 4:
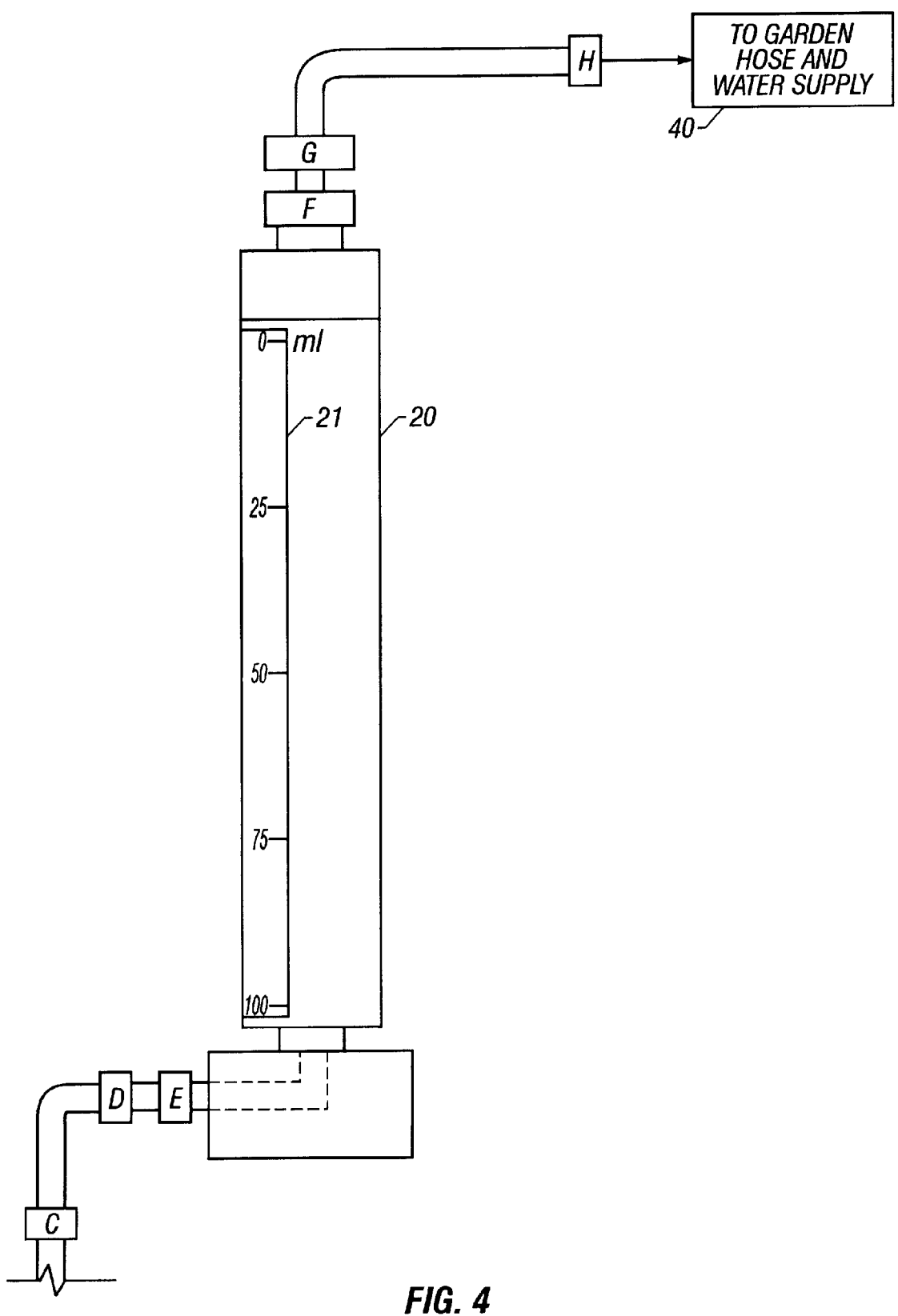
FIG. 4 is a schematic representation of the system set-up for flushing out the system.

Referring now to FIG. 4, to clean out the measuring cylinder 20, power flush fitting H (a standard female garden hose fitting) is connected to a standard garden hose outlet and water supply 40. Power flush QD fitting G is connected to measuring cylinder 20 QD fitting F, then charging/cleanout tubing QD fitting D is attached to measuring cylinder 20 QD fitting E allowing clear water to pass from the power flush QD fitting G, through the cylinder 20 and out through charging/cleanout tube QD fitting C unimpeded. QD fitting C must, of course, be terminated with a suitable adapter to hold it open during the flushing operation. The pump 10 may also be flushed (cleaned) out, if required, by connecting a suitable hose to the intake QD fitting B, immersing the free end of the hose in a container of water and applying power to the pump 10.

EXAMPLE

An experiment using the device was conducted in the following manner:

A. Measurement of volume injected per 45 second cycle was taken with the system's measuring cylinder 20 with the set-up and procedures of FIG. 3. Based upon this measurement, a projection of the number of cycles available from five gallons (640 oz.) of product was made.

B. The holding tank 12 was filled with ten gallons (US) of product. The level was accurately marked.

C. After the predicted number of cycles, the level was again accurately marked. The amount of product needed to restore the level to the beginning mark was 649 ounces versus the predicted 640 ounces. This resulted in an error of 1.4%.

The measuring cylinder 20 may be obtained from Griffco Valve, Inc., Middleport, N.Y., Part No. CC100S. The quick-disconnects may be obtained from Colder Products of Wisconsin. The female coupling bodies are Part No. PMDC100412. The male coupling bodies with insert are Part No. PMDC220412. Right angle fitting 16 is also manufactured by Colder.Dosing Pump 10 may be a Pulsation, Series A Plus which is manufactured by Pulsafeeder.

When used in a car wash facility, the pump 10 operates as follows:

A set of electric eyes and a computer 14 determine how long it takes the entire vehicle to pass a fixed point. As the vehicle approaches the application arch, the computer 14 energizes a normally-open relay allowing voltage to be sent to the pump 10. The relay stays closed until the vehicle has passed the application arch. The computer 14 then de-energizes the relay, stopping the pump 10. This procedure is common to almost all car wash equipment manufacturers.

What is claimed is:

1. A method for accurately delivering a small quantity of a liquid to a receiving apparatus comprising the steps of:
   a. filling a graduated container with said liquid;
   b. fluidly connecting said graduated container to the inlet of a dosing pump;
   c. adjusting said dosing pump for an approximate desired flow rate of said liquid;
   d. running said dosing pump for a selected period of time;
   e. accurately measuring the flow rate of said liquid over said selected period of time by determining the volume of said liquid removed from said graduated container in said selected period of time;
   f. disconnecting said graduated container from said dosing pump and replacing it with a supply container of said liquid;
   g. connecting the output of said dosing pump to a receiving means; and
   h. delivering said flow rate of said liquid to said receiving means.

2. The method of claim 1 wherein said flow rate of said liquid is in milliliters per unit of time.

3. The method of claim 2 wherein said flow rate of said liquid is in the range of one milliliter per minute to twenty milliliters per second.

4. The method of claim 3 wherein said flow rate of said liquid is in the range of four to ten milliliters per minute.

5. The method of claim 4 wherein said liquid is a hyper-concentrated fluid.

6. The method of claim 2 wherein said liquid is a hyper-concentrated fluid.

7. The method of claim 3 wherein said liquid is a hyper-concentrated fluid.

8. The method of claim 1 wherein said liquid is a hyper-concentrated fluid.

* * * * *